(12) United States Patent
Arikawa

(10) Patent No.: US 9,683,583 B2
(45) Date of Patent: Jun. 20, 2017

(54) METAL BELLOWS

(71) Applicant: EAGLE INDUSTRY CO., LTD., Tokyo (JP)

(72) Inventor: Tatsuhiro Arikawa, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/892,039

(22) PCT Filed: May 21, 2014

(86) PCT No.: PCT/JP2014/063417
§ 371 (c)(1),
(2) Date: Nov. 18, 2015

(87) PCT Pub. No.: WO2015/015873
PCT Pub. Date: Feb. 5, 2015

(65) Prior Publication Data
US 2016/0108935 A1 Apr. 21, 2016

(30) Foreign Application Priority Data
Aug. 2, 2013 (JP) ................... 2013-161336

(51) Int. Cl.
*F16J 3/04* (2006.01)
*F15B 1/10* (2006.01)

(52) U.S. Cl.
CPC ............... *F15B 1/103* (2013.01); *F16J 3/047* (2013.01); *F15B 2201/40* (2013.01)

(58) Field of Classification Search
CPC ........ F15B 1/103; F15B 2201/40; F16J 3/047
(Continued)

(56) References Cited

U.S. PATENT DOCUMENTS

| 3,030,983 A * | 4/1962 | Hamren | F16J 3/047 92/34 |
| 2004/0244857 A1* | 12/2004 | Suzuki | B60T 13/14 138/30 |
| 2009/0133768 A1 | 5/2009 | Miyake et al. | |

FOREIGN PATENT DOCUMENTS

| DE | 10138868 A1 | 3/2003 |
| EP | 0786534 A1 | 7/1997 |

(Continued)

OTHER PUBLICATIONS

FR2703124 Espacenet Machine Translation.*
Chinese Office Action dated Jun. 3, 2016.
Extended European Search Report dated Mar. 16, 2017.

*Primary Examiner* — Michael Leslie
*Assistant Examiner* — Dustin T Nguyen
(74) *Attorney, Agent, or Firm* — Harness, Dickey & Pierce, P.L.C.

(57) ABSTRACT

A metal bellows (110) for an accumulator (100) into which a hydraulic fluid is drawn in, has a bellows-shape in which ridge fold portions (110a) and valley fold portions (110b) are formed repeatedly with slope portions (110c) in between, wherein two of the slope portions (110c) that are adjacent to each other via a common ridge fold portion (110a) have: first slope portions (110c1) which extend from the common ridge fold portion (110a) and second slope portions (110c2) each of which extends from each of the first slope portions (110c1) such that a distance therebetween becomes much greater than the first slope portions (110c1) as the second slope portions (110c2) extend toward the adjacent valley fold portions (110b), wherein the first slope portion (110c1) and the second slope portion (110c2) are connected at an inflection point (P).

1 Claim, 3 Drawing Sheets

(58) Field of Classification Search
USPC .................................................. 92/47, 34, 35
See application file for complete search history.

(56) References Cited

FOREIGN PATENT DOCUMENTS

| | | | | |
|---|---|---|---|---|
| EP | 1508703 | A1 | 2/2005 | |
| EP | 1975417 | A1 | 10/2008 | |
| FR | 2703124 | * | 9/1994 | ................ F16J 3/04 |
| FR | 2703124 | A1 | 9/1994 | |
| JP | 2003-148616 | A | 5/2003 | |
| JP | 2003-343501 | A | 12/2003 | |
| JP | 2005-240834 | A | 9/2005 | |
| JP | 2007-192290 | A | 8/2007 | |
| JP | 2012-167748 | A | 9/2012 | |

\* cited by examiner

METAL BELLOWS

CROSS-REFERENCE TO RELATED APPLICATIONS

This application is a National Stage of International Application No. PCT/JP2014/063417, filed May 21, 2014 (now Published Application No. WO 2015/015873A1), which claims priority to Japanese Application No. 2013-161336, Aug. 2, 2013. The entire disclosures of each of the above applications are incorporated herein by reference.

FIELD

The present disclosure relates to a metal bellows for an accumulator.

BACKGROUND

Conventionally, there has been known a metal bellows for an accumulator into which a hydraulic fluid is drawn in, and which has a bellows-shape in which ridge fold portions on its radially outer side and valley fold portions on its radially inner side are formed repeatedly with slope portions in between. This metal bellows is disposed in a shell of the accumulator, and one end of the metal bellows is fixed to the shell side, whereas another end is closed by a bellows cap. An interior of the shell of the accumulator is partitioned by the bellows cap into a fluid chamber inside the bellows into which the hydraulic fluid is drawn in, and a gas chamber outside the bellows into which a pressure gas is charged. The metal bellows contracts as it discharges the hydraulic fluid from the fluid chamber, and expands as the hydraulic fluid is drawn into the fluid chamber.

As shown in FIG. 3 of Patent Literature 1 and FIG. 2B of Patent Literature 2, when the metal bellows is contracted from a free length, widths of ridge fold portions make almost no change, whereas distances between the adjacent slope portions become smaller in order for the bellows to contract.

When the bellows is in a contracted state, the adjacent slope portions make contact with each other while the widths of the ridge fold portions make no change, and hence the shape of the ridge fold portion becomes a bulb-shape to form a sealed space. If a temperature changes under a condition in which the hydraulic fluid or the pressure gas has entered into the sealed spaces having the bulb-shape, the hydraulic fluid or gas is caused to expand or contract, and hence a stress acting on the metal bellows may increase. If the stress increases excessively, there is a fear that the bellows may break. In addition, if adjacent slope portions make contact with each other, there may be a case where stresses acting on the contacting portions increase, and hence there is a fear that the bellows may break.

CITATION LIST

Patent Literature

Patent Literature 1: Japanese Patent Application Laid-Open No. 2007-192290.
Patent Literature 2: Japanese Patent Application Laid-Open No. 2012-167748.

SUMMARY

Technical Problem

Accordingly, an object of the present disclosure is to prevent a metal bellows from breaking due to a temperature change or a contact between adjacent slope portions, and to shorten the length of the metal bellows in an expansion-contraction direction at maximal contraction.

Solution to Problem

In order to solve the above problem, the present disclosure has adopted the following means.

That is, a metal bellows according to the present invention is a metal bellows for an accumulator into which a hydraulic fluid or a pressure gas is drawn in, the metal bellows is a cylindrical member having a bellows-shape in which ridge fold portions on its radially outer side and valley fold portions on its radially inner side are formed and in which the ridge fold portions and the valley fold portions are repeatedly with slope portions in between, wherein when the metal bellows is in its free length state, two of the slope portions that are adjacent to each other via a common ridge fold portion have: first slope parts each of which extends parallelly from the common ridge fold portion toward adjacent valley fold portions such that a distance between the first slope parts on two adjacent slope portions that share the common ridge fold portion remains constant; and second slope parts each of which extends linearly from each of the first slope parts extending from the common ridge fold portion toward the adjacent valley fold portions and each of which is steeper than the first slope part, wherein a width of the ridge fold portion becomes narrower toward its crest, and a distance between the adjacent ridge fold portions becomes greater toward the radially outer side, a width of the valley fold portion becomes narrower toward its crest, and a distance between the adjacent valley fold portion becomes greater toward the radially inner side, and when the metal bellows is in the maximal compression state, the adjacent ridge fold portions come into contact with each other, the adjacent valley fold portions do not come into contact with each other, and the adjacent slope portions as a whole also do not come into contact with each other.

According to the above configuration, as the slope portions that are adjacent to each other via the common ridge fold portion extend from the common ridge fold portion to respective adjacent valley fold portions, they become more distant to each other, and hence a distance between the adjacent valley fold portions and a distance between the adjacent slope portions become greater toward an inside of the metal bellows (from the ridge fold portion side to the valley fold portion side). Thus, when the metal bellows contracts, the adjacent valley fold portions are less likely to come into contact with each other, and the adjacent slope portions are also less likely to come into contact with each other. Consequently, a condition in which the hydraulic fluid or the pressure gas is sealed in the spaces in the metal bellows formed by the ridge fold portions is less likely to occur. In other words, even if the hydraulic fluid or the pressure gas is caused to expand or contract due to a temperature change under the condition in which the hydraulic fluid or the pressure gas has entered into the spaces in the metal bellows formed by the ridge fold portions, the stress acting on the metal bellows would not increase excessively. As a result, the metal bellows can be prevented from breaking.

In addition, in the above configuration, the width of the ridge fold portion becomes narrower toward its crest, and the width of the valley fold portion also becomes narrower toward its crest. Thus, the distance between the adjacent ridge fold portions becomes greater, and the distance between the adjacent valley fold portions also becomes greater. Accordingly, the length of the metal bellows at contraction in an expansion-contraction direction can be shortened without increasing the number of folds. In other words, the length (close-contact length) of the metal bellows in the expansion-contraction direction in a state where the adjacent ridge fold portions are in contact (in close contact) with each other due to the contraction of the metal bellows can be shortened. In addition, since the width of the ridge fold portion becomes narrower toward its crest, the space in the metal bellows formed by the ridge fold portion is less likely to become a tip-expanding (bulb-shaped) space when the metal bellows is contracted. Accordingly, the hydraulic fluid or the pressure gas is less likely to be contained in the space in the metal bellows formed by the ridge fold portion. Consequently, even if the hydraulic fluid or the pressure gas is caused to expand or contract due to the temperature change, the stress acting on the metal bellows would not increase excessively. As a result, the metal bellows can be prevented from breaking.

In addition, the adjacent ridge fold portions make contact with each other when the metal bellows is in a maximally contracted state. Further, the adjacent slope portions do not make contact with each other when the metal bellows is in the maximally contracted state. As mentioned, when the metal bellows is in the maximally contracted state, because the adjacent ridge fold portions make contact with each other, whereas the adjacent slope portions do not make contact with each other, a condition in which the hydraulic fluid or the pressure gas is sealed in the spaces in the metal bellows formed by the ridge fold portions is less likely to occur. Furthermore, since the adjacent slope portions do not come into contact with each other, the stresses acting on the contacting portions of the adjacent slope portions are prevented from increasing. As a result, the metal bellows can be prevented from breaking. In addition, since the adjacent ridge fold portions make contact while the adjacent slope portions do not, an amount of deformation of the metal bellows when it deforms from the pre-contracted state to the maximally contracted state can be enlarged. Thus, the expansion-to-contraction range of the metal bellows can be enlarged, and hence the length of the metal bellows in the expansion-contraction direction at maximal contraction can be shortened.

Advantageous Effects of the Disclosure

As described above, according to the present disclosure, it becomes possible to prevent the metal bellows from breaking due to a temperature change or a contact between adjacent slope portions, and to shorten the length of the metal bellows in the expansion-contraction direction at maximal contraction.

DRAWINGS

DETAILED DESCRIPTION

Hereinafter, modes for carrying out the present disclosure will be exemplarily described in detail based on embodiments thereof with reference to the drawings. However, the dimensions, materials, shapes, relative arrangements and so on of constituent parts described in the embodiments are not intended to limit the scope of the present disclosure to these alone in particular unless specifically described.

Example

<Overall Configuration of Accumulator>

Figure 1:
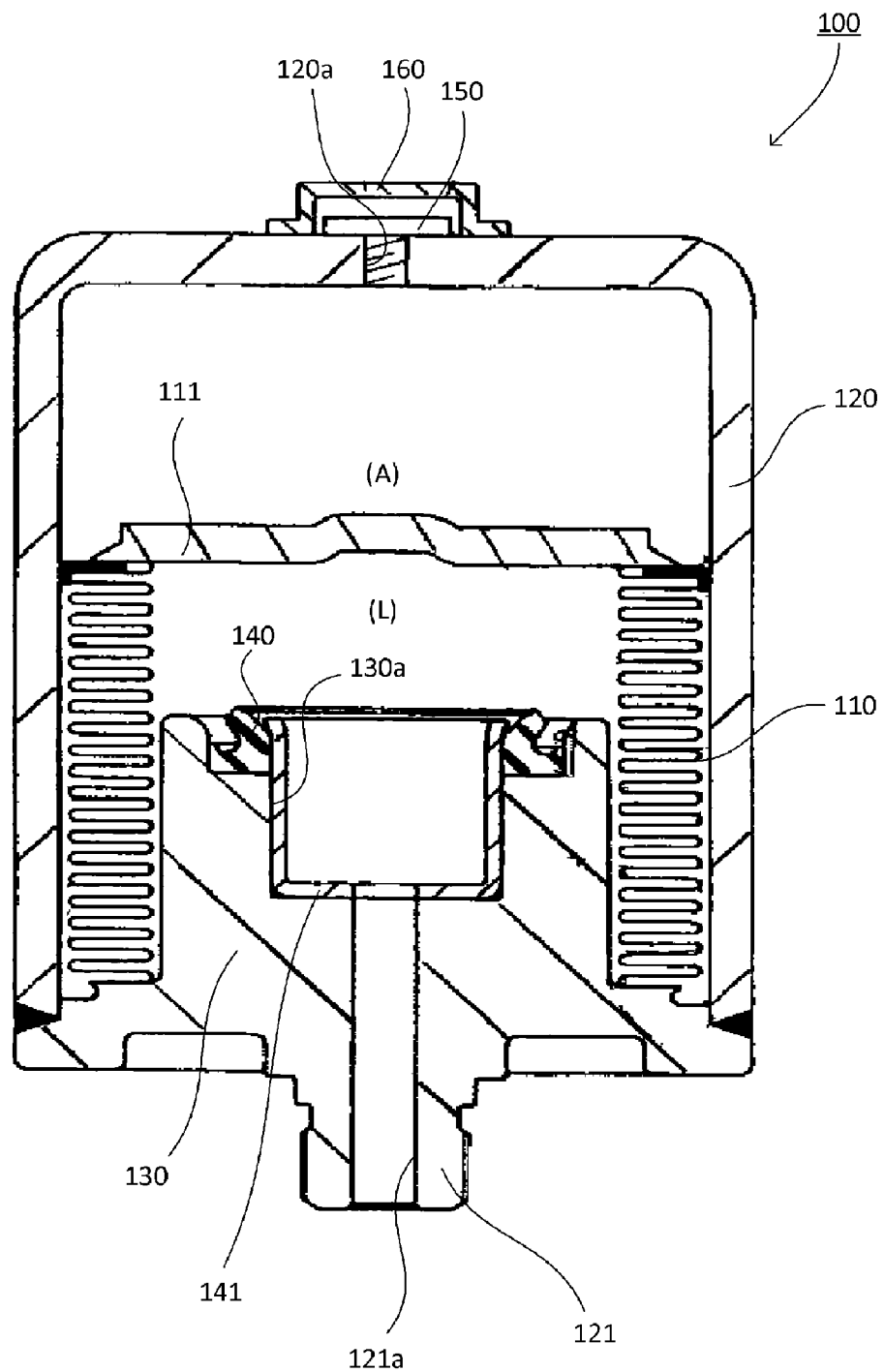
FIG. 1 is a schematic cross-sectional view illustrating an overall configuration of an accumulator according to an example of the present disclosure.

First, an overall configuration of an accumulator having a metal bellows according to an example of the present disclosure will be described with reference to FIG. 1. FIG. 1 is a schematic cross-sectional view illustrating an overall configuration of the accumulator according to the present example. It should be noted that the shape of the metal bellows is simplified in FIG. 1 for the convenience of explanation of the overall configuration of an accumulator 100, and details of the bellows-shape of the metal bellows according to the present example will be described with reference to FIG. 2 and FIG. 3.

As shown in FIG. 1, the accumulator 100 according to the present example includes a metal bellows 110, a shell 120, an oil port 130, a sealing portion 140, a gas plug 150, and a hexagonal nut 160 as principal constituent parts.

An attachment portion 121 for a non-illustrated system is provided on one end side (lower side of FIG. 1) of the cylindrical shell 120. An inlet 121a for drawing a hydraulic fluid from the system side into inside of the shell is formed on the attachment portion 121. A charging inlet 120a for charging a pressure gas into inside of the shell 120 is formed on another end side (upper side of FIG. 1) of the shell 120. The gas plug 150 that closes the charging inlet 120a is provided such that it is covered with the hexagonal nut 160 that is used to secure the accumulator 100 to the system.

The cylindrical metal bellows 110 is disposed in the shell 120. One end of the metal bellows 110 is welded and secured to the oil port 130, and another end thereof is welded and secured to a cap (hereinafter referred to as a bellows cap) 111 that is movable in a longitudinal direction in FIG. 1 so that the other end thereof is closed.

An interior of the shell 120 is partitioned by the bellows cap 111 into a fluid chamber L and a gas chamber A. The fluid chamber L is disposed inside the metal bellows 110 and bellows cap 111, and into which a hydraulic fluid is drawn in, whereas the gas chamber A is disposed outside the metal bellows 110 and the bellows cap 111, and into which a pressure gas is charged. The metal bellows 110 makes an expansion-contraction (reciprocative) movement in the longitudinal direction in FIG. 1 due to accumulation and discharge of the hydraulic fluid into and from the fluid chamber L. For example, when the accumulated hydraulic fluid is discharged from the fluid chamber L to the system side, the pressure of the hydraulic fluid in the fluid chamber L becomes lower than the pressure of the pressure gas in the gas chamber A, thereby causing the metal bellows 110 to contract due to the pressure gas in the gas chamber A.

Note that on one end side (lower side in FIG. 1) of the oil port 130 is welded to the shell 120, and a groove portion 130a is formed on another end side (upper side in FIG. 1) thereof. A metal sealing holder 141 that holds the sealing portion 140 is welded and secured to the groove portion 130a. When the metal bellows 110 has contracted and the bellows cap 111 has come down to the lowest position on the lower side in FIG. 1, in other words, when the metal bellows 110 is in the maximally contracted state (maximal compression state), the sealing portion 140 seals the fluid that remains in the metal bellows 110 so that leakage of the fluid through the inlet 121a is prevented, <Configuration of Metal Bellows>

Figure 2:
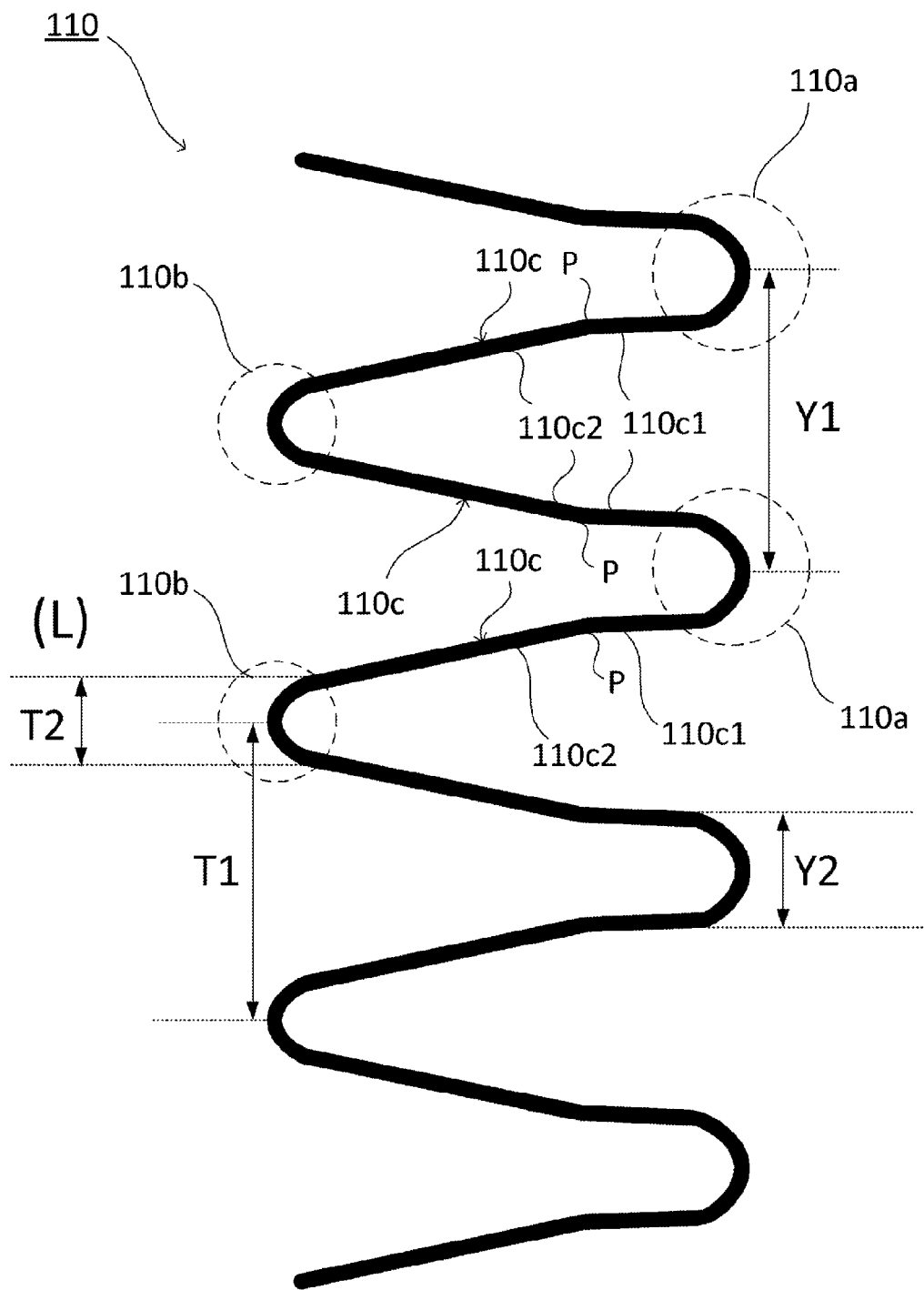
FIG. 2 is an enlarged cross-sectional view illustrating folds of a metal bellows according to the present example, and is a view illustrating the metal bellows in a state of free length.

Next, with reference to FIG. 2, a configuration of the metal bellows according to the present example will be described. FIG. 2 is an enlarged cross-sectional view illustrating folds of the metal bellows according to the present example, and is a view illustrating the metal bellows in its state of free length.

The metal bellows 110 according to the present example has ridge fold portions 110a on its radially outer side and valley fold portions 110b on its radially inner side. As such, the metal bellows 110 is a cylindrical member having a bellows-shape in which the ridge fold portions 110a and the valley fold portions 110b are formed repeatedly with slope portions 110c in between.

As shown in FIG. 2, a distance between the adjacent ridge fold portions 110a is represented by Y1, and a width of the ridge fold portion 110a is represented by Y2. In addition, a distance between the adjacent valley fold portions 110b is represented by T1, and a width of the valley fold portion 110b is represented by T2. The metal bellows 110 expands and contracts as the distance Y1 and the distance T1 change. Even when the metal bellows 110 expands or contracts, the width Y2 and the width T2 do not largely change.

<Advantages of Present Example>

Figure 3:
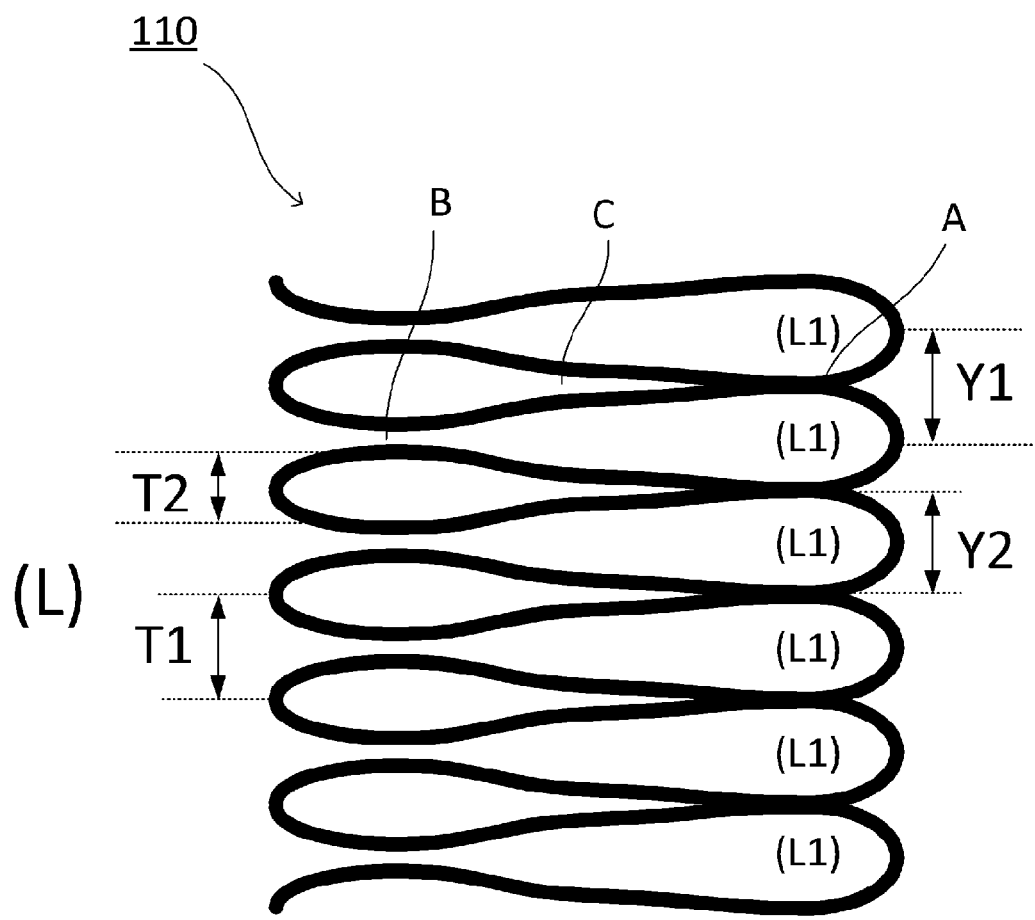
FIG. 3 is an enlarged cross-sectional view illustrating the folds of the metal bellows according to the present example, and is a view illustrating the metal bellows in a maximal compression state.

Next, with reference to FIG. 2 and FIG. 3, advantages of the present example will be described. FIG. 3 is an enlarged cross-sectional view illustrating the folds of the metal bellows according to the present example, and is a view illustrating the metal bellows in its maximal compression state.

The hydraulic fluid filled in the metal bellows 110 expands and compresses due to a temperature change. In a case where the metal bellows 110 is contracted, if the adjacent slope portions come into contact with each other and a space L1 of the ridge fold portion 110a becomes a sealed space, like the metal bellows disclosed in Patent Literatures 1 and 2, there is a fear that the metal bellows 110 might break as the expansion or compression of the hydraulic fluid due to the temperature change would increase the stresses acting on the portions of the metal bellows 110 that form the spaces L1. In consideration of the above, the metal bellows 110 according to the present example employs a configuration in which the hydraulic fluid is not sealed in the space L1 inside the metal bellows 110 formed by the ridge fold portion 110a even when it is contracted.

Specifically, when the metal bellows 110 is in its free length state, two slope portions 110c that are adjacent to each other via a common ridge fold portion 110a have first slope parts 110c1 each of which extends parallelly from the common ridge fold portion 110a toward adjacent valley fold portions 110b such that a distance between the first slope parts 110c1 on two adjacent slope portions 110c that share the common ridge fold portion 110a remains constant. Further, the slope portions 110c have second slope parts 110c2 steeper than the first slope parts 110c1, each of which extends linearly from each of the first slope parts 110c1 extending from the common ridge fold portion 110a toward the adjacent valley fold portions 110b As shown in FIG. 2, the adjacent first slope parts 110c1 extend parallelly, and the adjacent second slope parts 110c2 extend such that the distance between the second slope parts 110c2 on two adjacent slope portions 110c that share the common ridge fold portion 110a becomes greater with gradients that are greater than those of the adjacent first slope parts 110c1. In addition, as shown in FIG. 2, the first slope part 110c1 and the second slope part 110c2 are such that cross sections thereof are connected at an point where there is a change in a slope angle P, and are configured such that the shape of the cross sections become nearly straight lines. Note that the shape of the cross section is the shape on a cross section including a center line of the metal bellows 110.

By employing such a configuration, as shown in FIG. 3, the adjacent ridge fold portions 110a come into contact with each other (contacting portion A) when the metal bellows 110 is in the maximal compression state. On the other hand, as shown in FIG. 3, the adjacent valley fold portions 110b do not come into contact with each other (non-contacting portion B), and the adjacent slope portions 110c as a whole also do not come into contact with each other (non-contacting portion C) when the metal bellows 110 is in the maximal compression state.

As described, because the adjacent valley fold portions 110b do not come into contact with each other, and the adjacent slope portions 110c also do not come into contact with each other even when the metal bellows 110 is in the maximal compression state, the hydraulic fluid in the space L1 in the metal bellows 110 formed by the ridge fold portion 110a is not sealed. Accordingly, even if a temperature change occurs under a condition in which the hydraulic fluid has entered into the space L1 in the metal bellows 110 formed by the ridge fold portion 110a, the stresses acting on the portions of the metal bellows 110 that form the space L1 would not be increased excessively. Further, because the adjacent slope portions 110c do not make contact with each other, the stress acting on the contacting portion thereof is prevented from increasing. As a result, the metal bellows 110 can be prevented from breaking.

In addition, as shown in FIG. 2, in the configuration of the present example, the width Y2 of the ridge fold portion 110a becomes narrower toward its crest, and the width T2 of the valley fold portion 110b also becomes narrower toward its crest. Thus, the distance Y1 between the adjacent ridge fold portions 110a becomes greater toward the radially outer side, and the distance T1 between the adjacent valley fold portion 110b becomes greater toward the radially inner side. Accordingly, a stroke of the metal bellows 110 can be enlarged without increasing the number of folds (in other words, the expansion-to-contraction range of the metal bellows 110 can be enlarged). In addition, as the maximal compression length of the metal bellows 110 is determined by the width of the ridge fold portion 110a because the slope portion 110c is enclosed between the ridge fold portions 110a when the metal bellows 110 is contracted, the maximal compression length of the metal bellows 110 can be shortened. In other words, the length (close-contact length) of the metal bellows 110 in the expansion-contraction direction in a state where the adjacent ridge fold portions 110a are in contact (in close contact) with each other due to the contraction of the metal bellows 110 can be shortened. In addition, since the width Y2 of the ridge fold portion 110a becomes narrower toward its crest, the space L1 in the metal bellows 110 formed by the ridge fold portion 110a is less likely to become a tip-expanding (bulb-shaped) space. Accordingly, the hydraulic fluid is less likely to be contained in the space L1 in the metal bellows 110 formed by the ridge fold portion 110a. Consequently, the stress acting on the metal bellows 110 would not increase excessively even when the hydraulic fluid expands or compresses due to the temperature change.

(Others)

In the present example, the width Y2 of the ridge fold portion 110a and the width T2 of the valley fold portion 110b are set to be almost equal, but they are not limited to this. The width Y2 may be wider than the width T2, or it may be narrower than the width T2.

In addition, in the present example, the configuration is adopted in which the inside of the metal bellows 110 is the fluid chamber L, and the outside of the metal bellows 110 is the gas chamber A. However, even if a configuration in which the inside of the metal bellows 110 is the gas chamber A, and the outside of the metal bellows 110 is the fluid chamber L is adopted, the same effect can be obtained.

REFERENCE SIGNS LIST

100: accumulator
110: metal bellows
110a: ridge fold portion
110b: valley fold portion
110c: slope portion
110c1: first slope part
110c2: second slope part
111: bellows cap
120: shell
120a: charging inlet
121: attachment portion
121a: inlet
130: oil port
130a: groove portion
140: sealing portion
141: sealing holder
150: gas plug
160: hexagonal nut
Y1: distance between adjacent ridge fold portions
Y2: width of ridge fold portion
T1: distance between adjacent valley fold portions
T2: distance of valley fold portion

The invention claimed is:

1. A metal bellows for an accumulator into which a hydraulic fluid or a pressure gas is drawn in, the metal bellows is a cylindrical member having a bellows-shape in which ridge fold portions on its radially outer side and valley fold portions on its radially inner side are formed and in which the ridge fold portions and the valley fold portions are repeatedly formed with slope portions in between, wherein
when the metal bellows is in its free length state, two of the slope portions that are adjacent to each other via a common ridge fold portion have:
first slope parts each of which extends parallelly from the common ridge fold portion toward adjacent valley fold portions such that a distance between the first slope parts on two adjacent slope portions that share the common ridge fold portion remains constant; and
second slope parts which are steeper than the first slope parts, each of which extends linearly from each of the first slope parts extending from the common ridge fold portion toward the adjacent valley fold portions, wherein
a width of the ridge fold portion becomes narrower toward its crest, and a distance between the adjacent ridge fold portions becomes greater toward the radially outer side,
a width of the valley fold portion becomes narrower toward its crest, and a distance between the adjacent valley fold portion becomes greater toward the radially inner side, and
when the metal bellows is in the maximal compression state, the adjacent ridge fold portions come into contact with each other, the adjacent valley fold portions do not come into contact with each other, and the adjacent slope portions as a whole also do not come into contact with each other.

* * * * *